Aug. 9, 1927.  1,638,654
J. C. CARLTON
RADIAL DRILL
Filed March 12, 1924   12 Sheets-Sheet 1

Inventor:
Jack C. Carlton
By Wood & Wood
Attorneys

Aug. 9, 1927. 1,638,654
J. C. CARLTON
RADIAL DRILL
Filed March 12, 1924  12 Sheets-Sheet 4
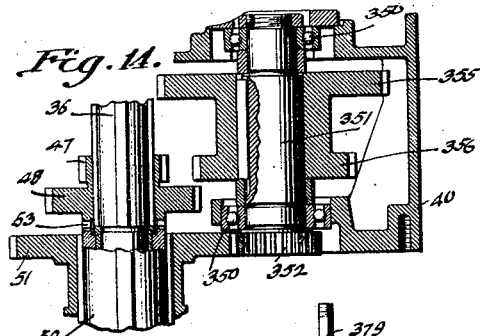
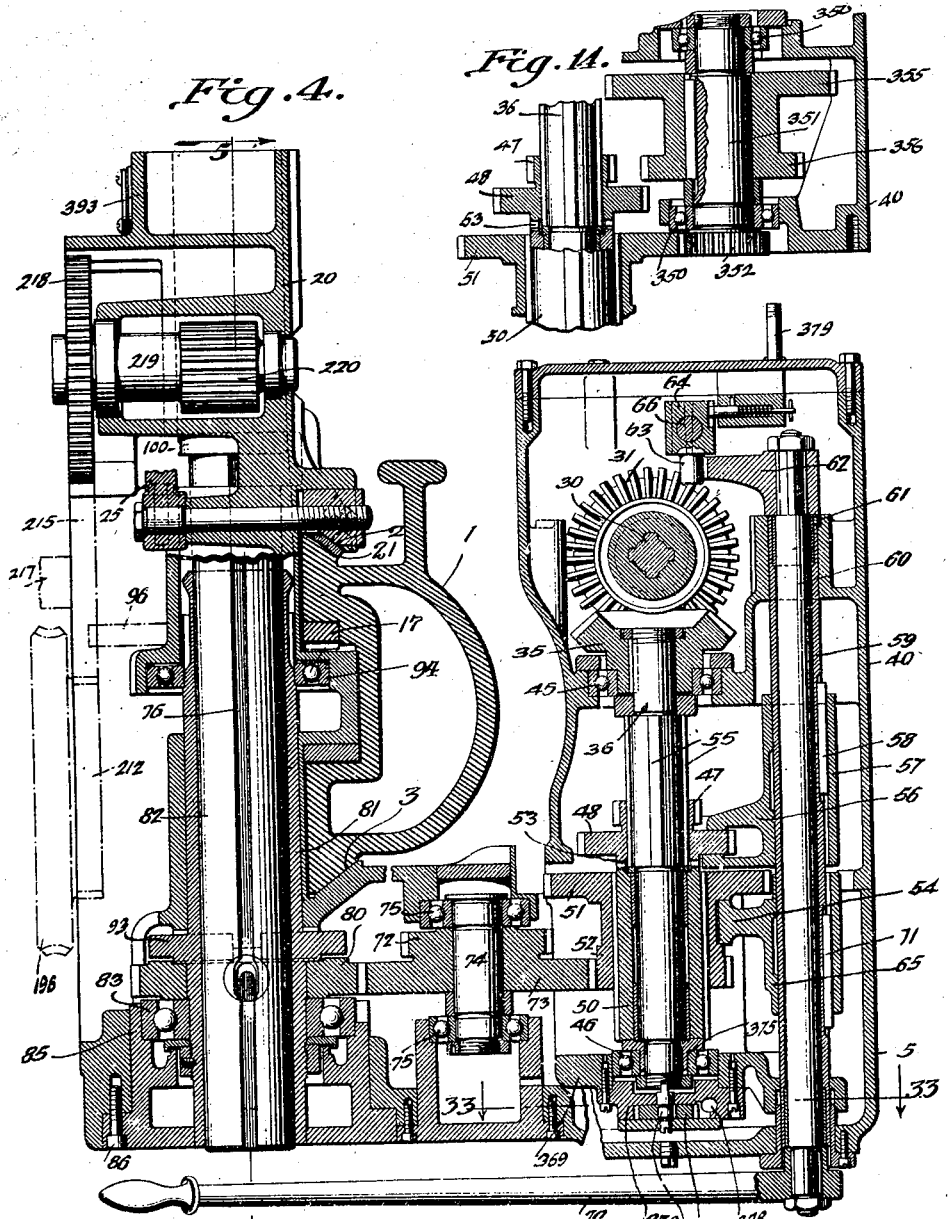
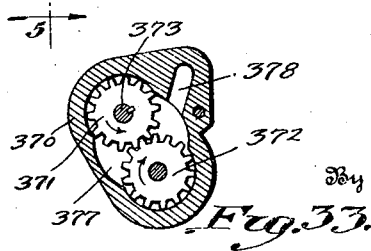
Inventor:
Jack C. Carlton
By Wood & Wood
Attorneys

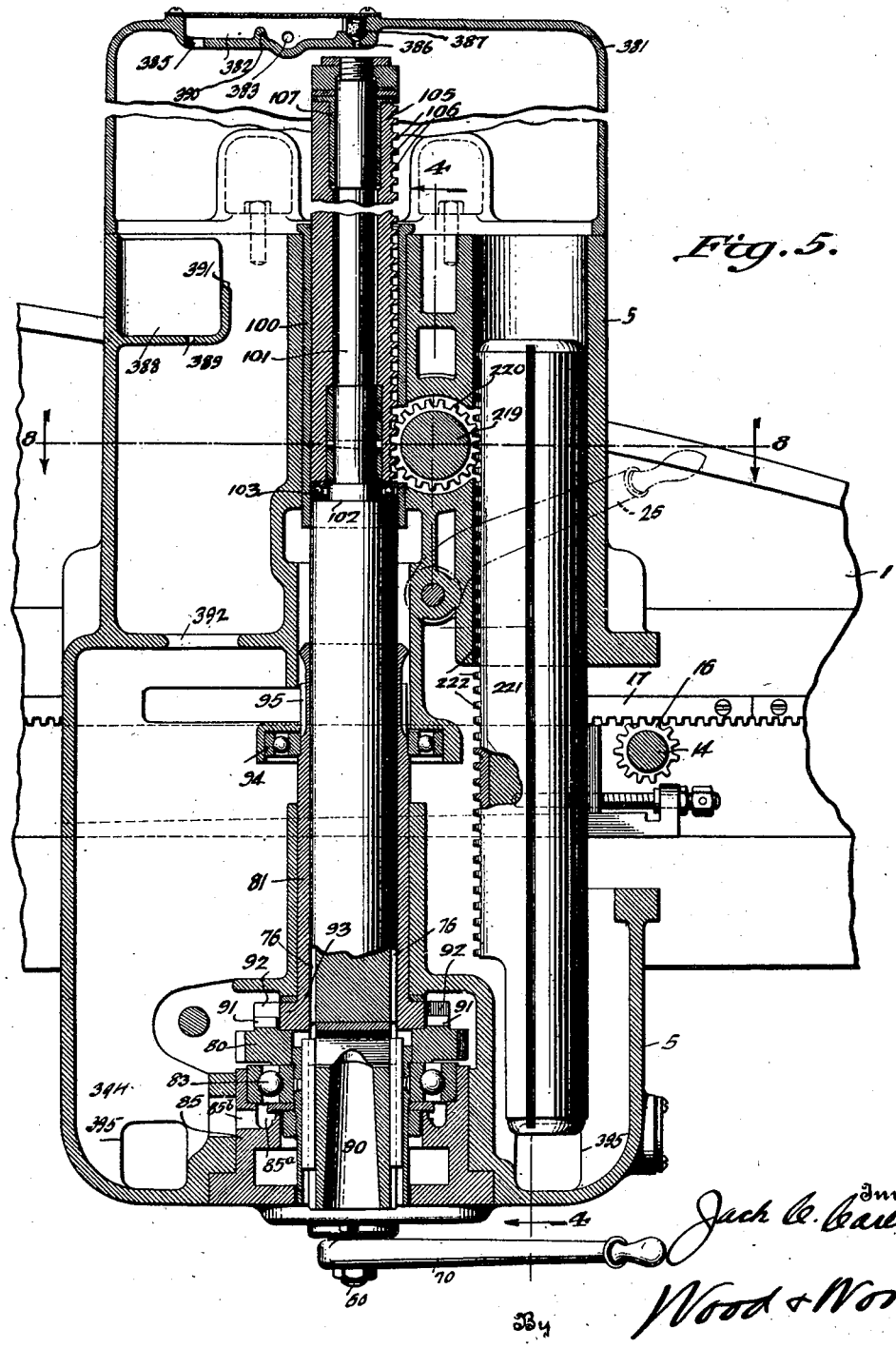

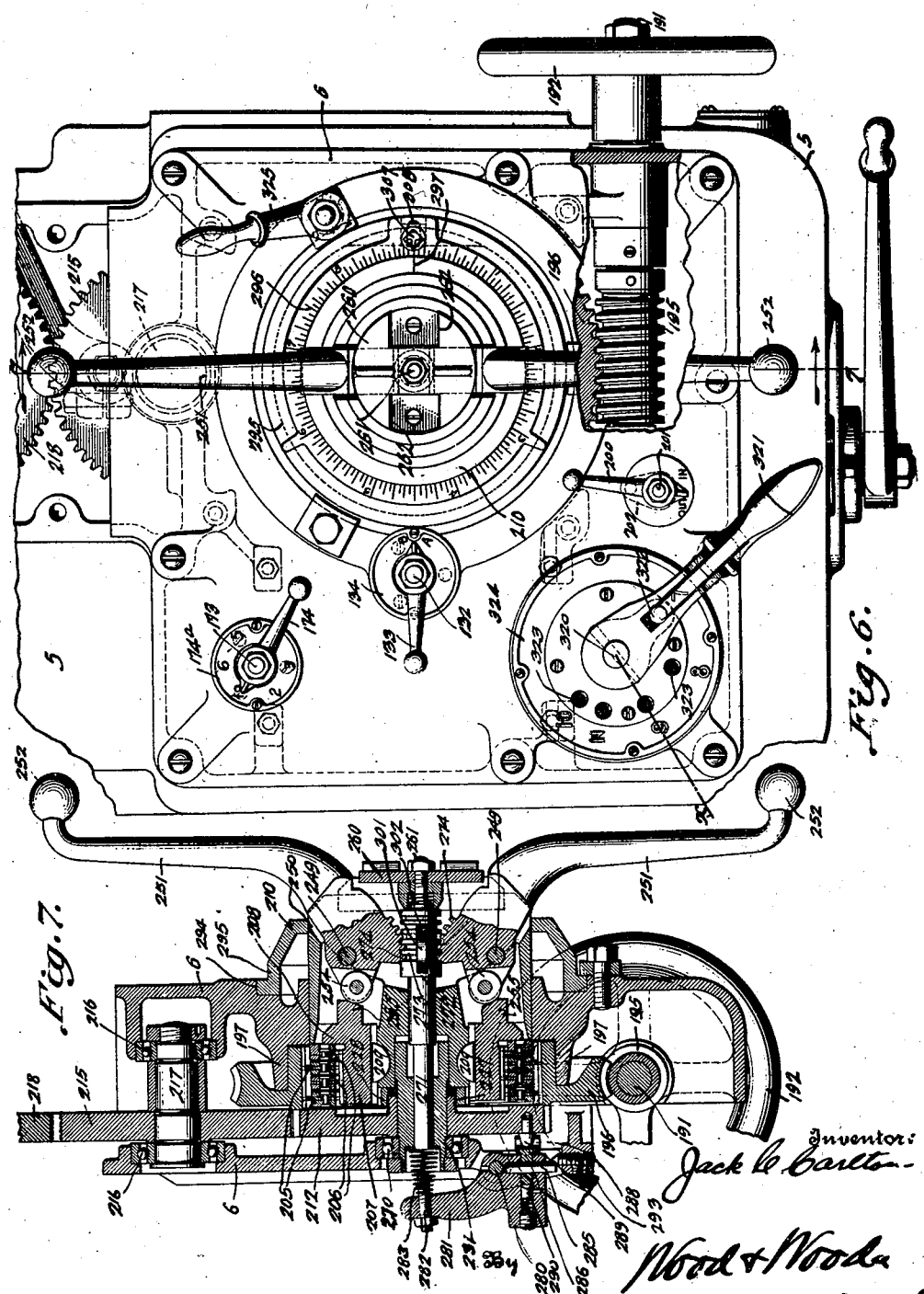

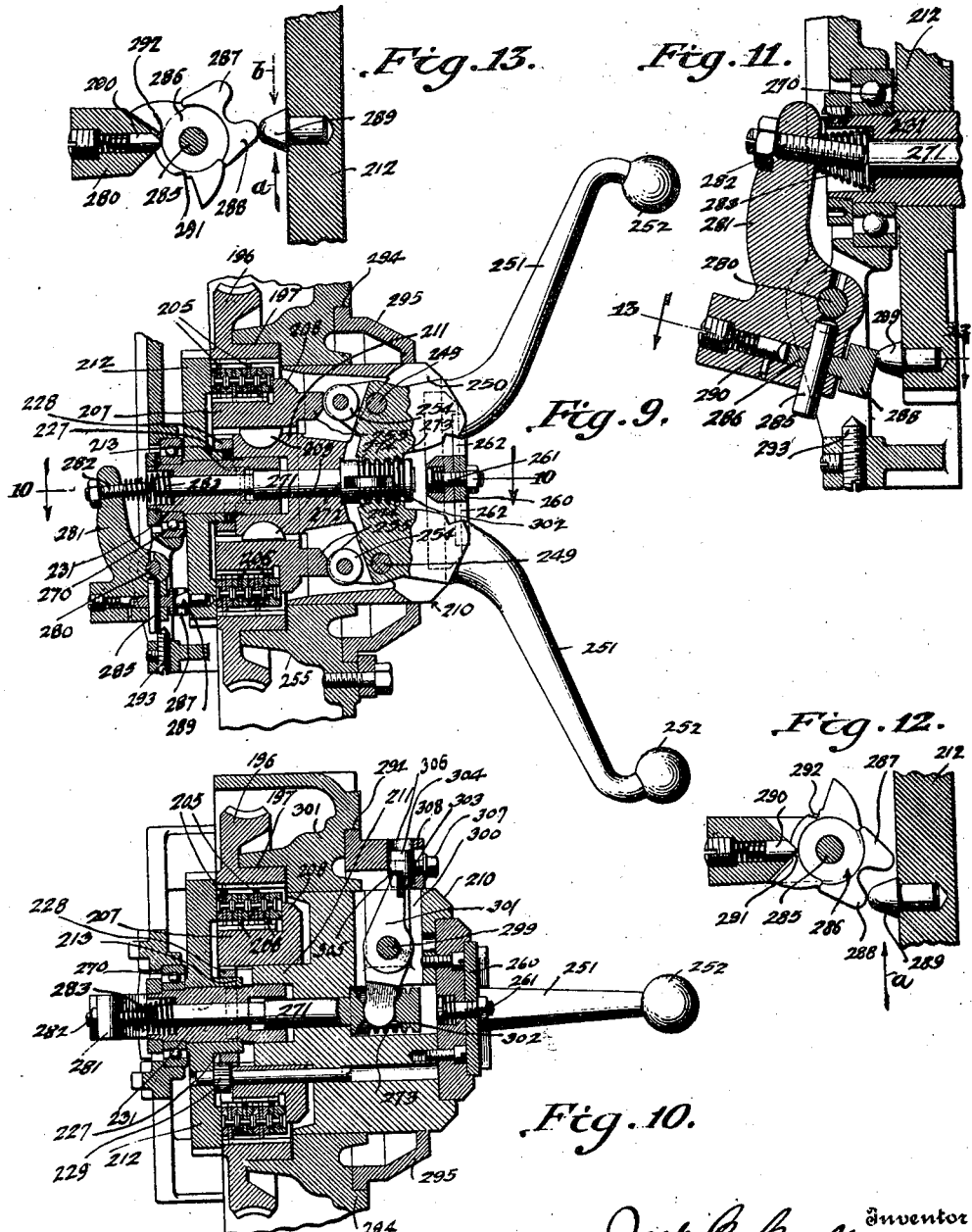

Aug. 9, 1927. 1,638,654
J. C. CARLTON
RADIAL DRILL
Filed March 12, 1924 12 Sheets-Sheet 8

Inventor:
Jack C. Carlton
By Wood & Wood
Attorneys

Aug. 9, 1927.
J. C. CARLTON
1,638,654
RADIAL DRILL
Filed March 12, 1924   12 Sheets-Sheet 9
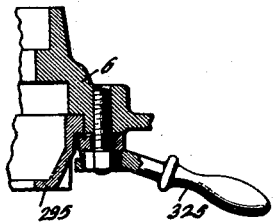
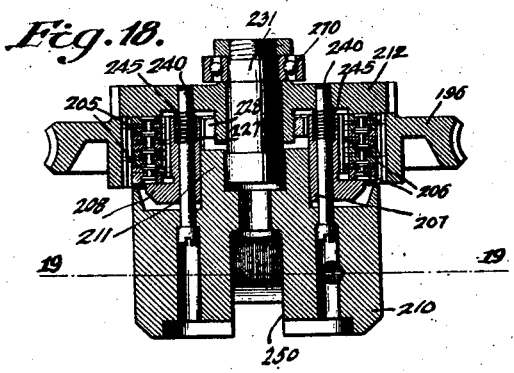
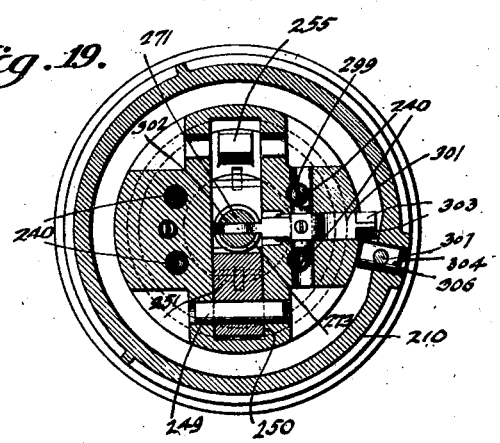
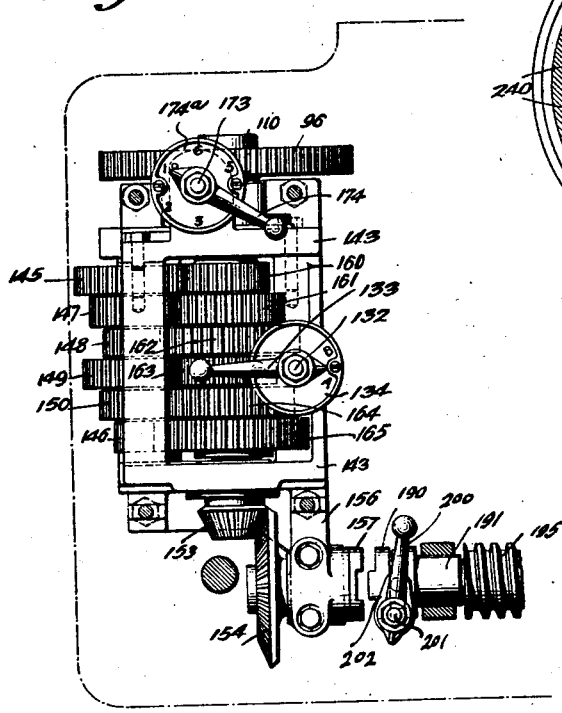
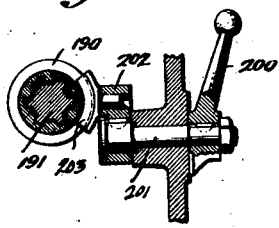
Inventor: Jack C. Carlton
By Wood & Wood
Attorneys

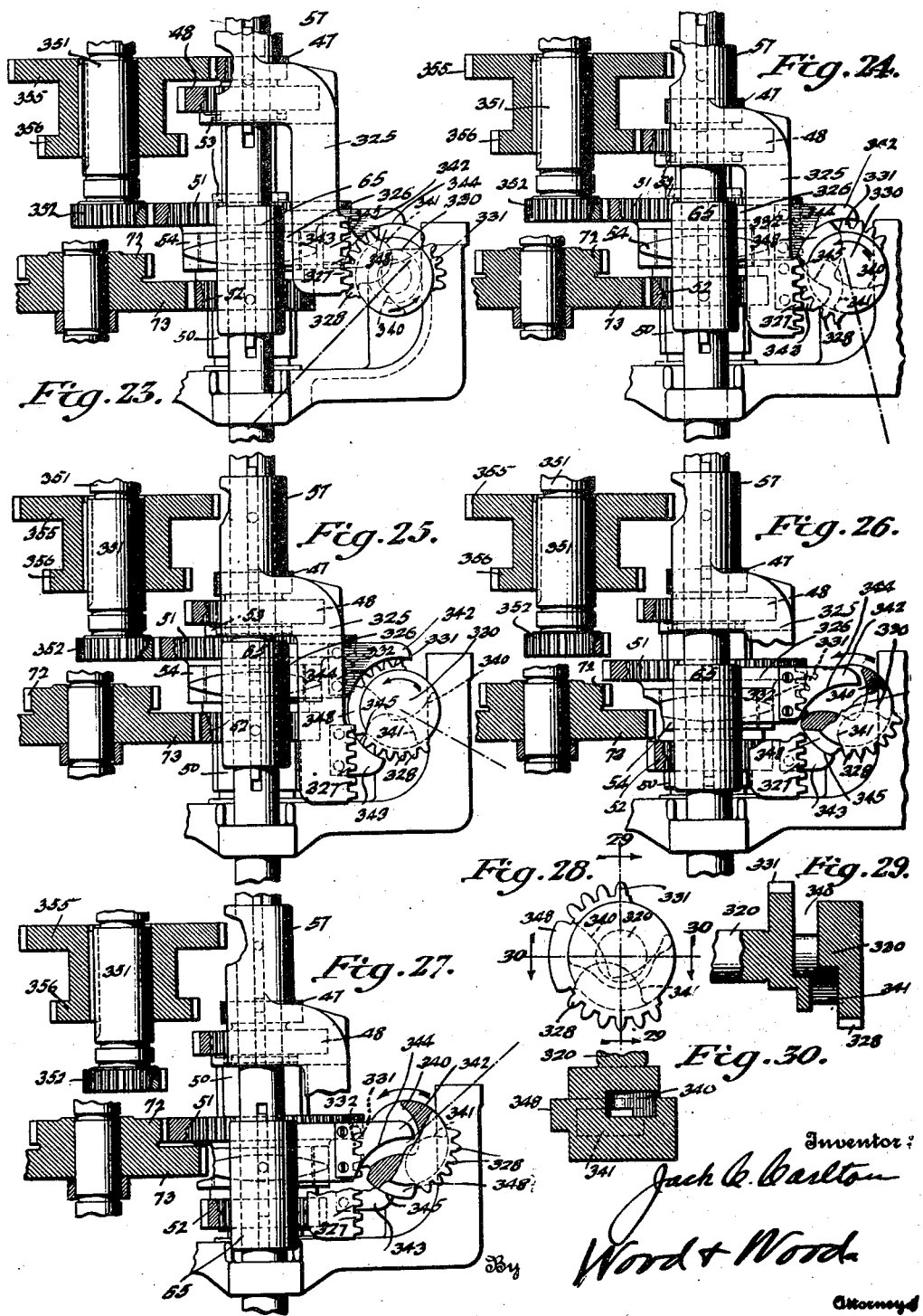

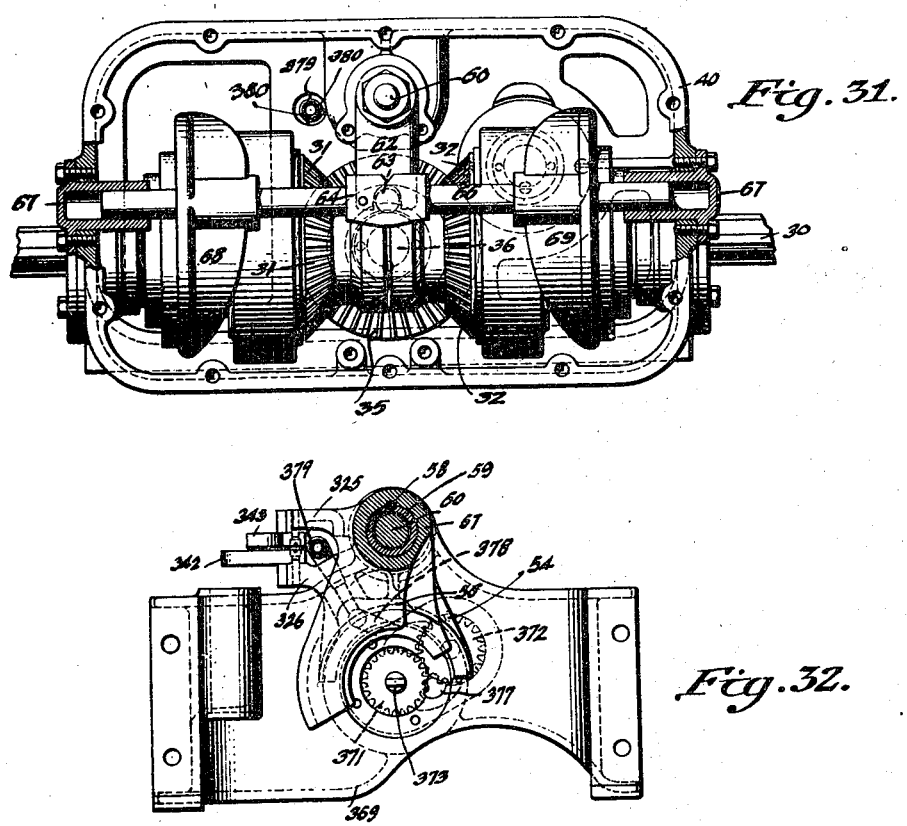

Patented Aug. 9, 1927.

1,638,654

UNITED STATES PATENT OFFICE.

JACK C. CARLTON, OF CINCINNATI, OHIO, ASSIGNOR TO THE CARLTON MACHINE TOOL COMPANY, OF CINCINNATI, OHIO, A CORPORATION OF OHIO.

RADIAL DRILL.

Application filed March 12, 1924. Serial No. 698,686.

This invention relates generally to radial drilling machines, and is particularly directed to improvements in head construction, including improvements in the mounting of and application of power to the spindle, mechanism for controlling rotative speed of the spindle, and mechanism for feeding or translating the spindle, as well as features of the general construction. The mechanism of the head includes improved means for feeding or translating the spindle at varying rates of speed, both in forward and reverse directions, as well as improved means for rotating the spindle at varying rates of speed. The transmission and reversing mechanisms are placed, in this instance, at the rear of the rail, and the spindle and various other mechanisms related thereto, at the front of and beneath the rail.

An object of the invention is to provide an improved clutch, and mechanism for controlling and operating the spindle, the same being interposed between and transmittingly connected with gears of the spindle translating transmission gear train, whereby spindle translation can be discontinued during spindle rotation.

Another object is to provide improved means, manually operable, for effecting engagement of the clutch, and automatically operable for disengaging the clutch at limits of translation in either direction, said means being in the nature of a safety device to prevent over-translation of the spindle.

Another object of the invention is to provide means for adjusting the clutch elements to take up for wear between the same, said means including elements for adjusting the thrust receiving members relative to one another.

Another object is to provide improved means, automatically operable, for disengaging the clutch, to discontinue spindle feed at any point between its translative limits, to prevent over-feed and consequent injury to machine, tool or work.

Other features are an improved clutch, clutch operating mechanism, and safety or tripping devices for disengaging the clutch operating means. These constructions include means for compressing said discs, consists of diametrically related handles adapted to be pulled toward one another to apply the clutch, and also acting as means for manually translating the spindle after power is disconnected. The handles when pulled together, also operate to set safety-trip mechanism, which is subsequently operable to automatically disengage the clutch and stop spindle translation at predetermined points.

Important features of the invention are the application of power at the lowermost end of the spindle, and adjacent the lower side of the head, and the mounting of the spindle in a manner to permit application of power at the lowermost portion of spindle and head whereby whipping of the spindle is avoided and consequent wear of parts greatly reduced.

Another feature consists in the manner of rotating the spindle by means of a relatively long sleeve slidably keyed thereto whereby a longer bearing for the spindle is obtained, which makes for rigidity and prevents uneven wear, and whereby simultaneous spindle rotation and translation is provided for, the spindle being translatably keyed to the sleeve. To this end a relatively long sleeve is rotatably mounted in upper and lower bearings of the head, the lower bearing being immediately adjacent of the lower wall of the head at a point below the level of the arm. The driving gear for the spindle is attached to the sleeve adjacent the lower end of the sleeve, at the lowermost level, intermediate the sleeve supporting bearings, and therefore immediately adjacent the lower bearing.

Another object of the invention is to provide a balanced head, the head and mechanism therein being so arranged that undue torsional strain upon the arm is avoided. This object is accomplished by providing a sectional head composed of frame or casing sections arranged in balanced relation, in front, beneath, and at the rear of the rail, one of said sections being slidably attached upon the rail, and the various mechanisms proportioned for balanced relation therein. A feature of this improvement also relates to the mounting and various mechanisms in the form of detachable units within the frame sections of the head.

Another feature of the invention is the application of power to the spindle at a point below the level of the arm, and at the lowest possible point of the spindle.

Another object of the invention is provision of an improved selective shifting mechanism, operable from the front of the head, for shifting the speed change gears of the spindle driving mechanism. This mechanism includes means for selectively shifting the gears, as well as means for alternately safety-locking the shifter members.

Another object of the invention is the provision of an improved speed change mechanism for varying the speed of spindle translation, said mechanism being located at a point intermediate the spindle-rotating sleeve and my improved clutch mechanism. The driving element of the speed change mechanism is in geared connection with the sleeve, and the driven element is connected by intermediate shafts with the driving element of the clutch. These intermediate shafts are provided with a clutch for coupling and uncoupling the shafts. The improved mechanism includes means for selectively obtaining spindle translative speeds in geometrical progression, the means being controllable from the front of the head by a lever, having a pointer adapted to ride over a dial, which dial has thereon characters indicative of speeds obtainable for a given setting. The arrangement of the gears is such that constant speed ratio is maintained between rotative and translative movements of the spindle.

Another object of the invention is to provide a force-feed gravity lubricating system, operable to deliver oil at the top of the casings of the head and above the various mechanisms, the spindle casing being provided with a relative superposed reservoir, one at the top as a receiving reservoir adapted to discharge oil upon the upper end of the spindle and into the lower auxiliary reservoir, which reservoir is adapted to overflow at one side and splash lubricate the mechanism therebelow. The lower reservoir has a drain opening therein, and the casing there-adjacent has a sight opening, permitting a view of the interior of the lower reservoir, so that when the supply thereto is interrupted, the same will empty by the drain opening, this condition being observable through the sight opening.

Another object is to provide a hollow head for drilling machine having means therein for lubricating the mechanism, said means comprising a pump operated by a portion of the mechanism, lying at the bottom of the reservoir and connected at its output side by suitable conduit, discharging at the upper part of the head into a receiving reservoir forming one of a series of vertically aligned reservoirs within the casing, the oil being delivered in cascade from one reservoir to another and thence downwardly to the mechanism therebeneath. This lubricating system in conjunction with the U-shaped underslung head for containing the mechanism forms an important feature of the invention.

Other features of the invention relate to the arrangement of the operating levers at the front side of the head, where the same may be conveniently manipulated, and to the application of power to the spindle adjacent the working end thereof.

Other objects and certain advantages will be pointed out in the description of the drawings forming a part of this specification, and in said drawings:

Figure 4 is a vertical transverse section taken through the spindle and transmission mechanism approximately on the line 4—4, of Fig. 3.

Figure 5 is a vertical section through the spindle and balancing mechanism therefor, taken approximately upon the line 5—5, of Fig. 4. Upon this figure has also been indicated the line 4—4, indicating in vertical plane the approximate line of section of Fig. 4.

Figure 6 is a front elevation of the head, the upper part thereof being broken away.

Figure 7 is a vertical transverse section of the mechanism for limiting the depth feed of the spindle.

Figure 9 is a vertical transverse section through the spindle depth limit mechanism.

Figure 10 is a section at right angles to Fig. 9 on line 10—10 of that figure.

Figure 11 is an enlarged detail of the trip mechanism for limiting translative feed movement of the spindle, shown in its trip position.

Figure 12 is a plan section showing the relations of portions of the automatic throw-out or safety trip mechanism for limiting translative movement and depth-feed of the spindle.

Figure 13 is a view similar to Figure 12, on line 13—13 of Fig. 11.

Figure 14 is a vertical section on line 14—14, of Fig. 3, showing a portion of the transmission mechanism.

Figure 17 is a view of the mechanism of Fig. 15 viewed from the front.

Figure 18 is a horizontal sectional view through the worm and clutch mechanism.

Figure 19 is a vertical sectional view on line 19—19 of Fig. 18.

Figure 20 is a detail horizontal sectional view of the clamping mechanism for the dial.

Figure 21 is a section through the clutch shifting mechanism for the power control of the spindle feed or translation.

Figures 23 to 27 inclusive, are diagrammatic views illustrating the spindle rotation speed-change mechanism.

Figure 28 is an end view of the rotative spindle speed-change mechanism operating gear cam.

Figure 29 is a vertical section on line 29—29, of Fig. 28.

Figure 30 is a horizontal section on line 30—30 of Fig. 28.

Figure 31 is a plan view of the reversing mechanism.

Figure 32 is a plan of the rotative spindle speed-change mechanism shifting levers.

Figure 33 is a section on line 33—33, Fig. 4.

The improved balanced head comprises a plurality of casings or separable frame sections, in which sections or casings are contained, in unit form, mechanisms for translatably feeding and rotating the spindle at varying rates of speed.

Figure 1:
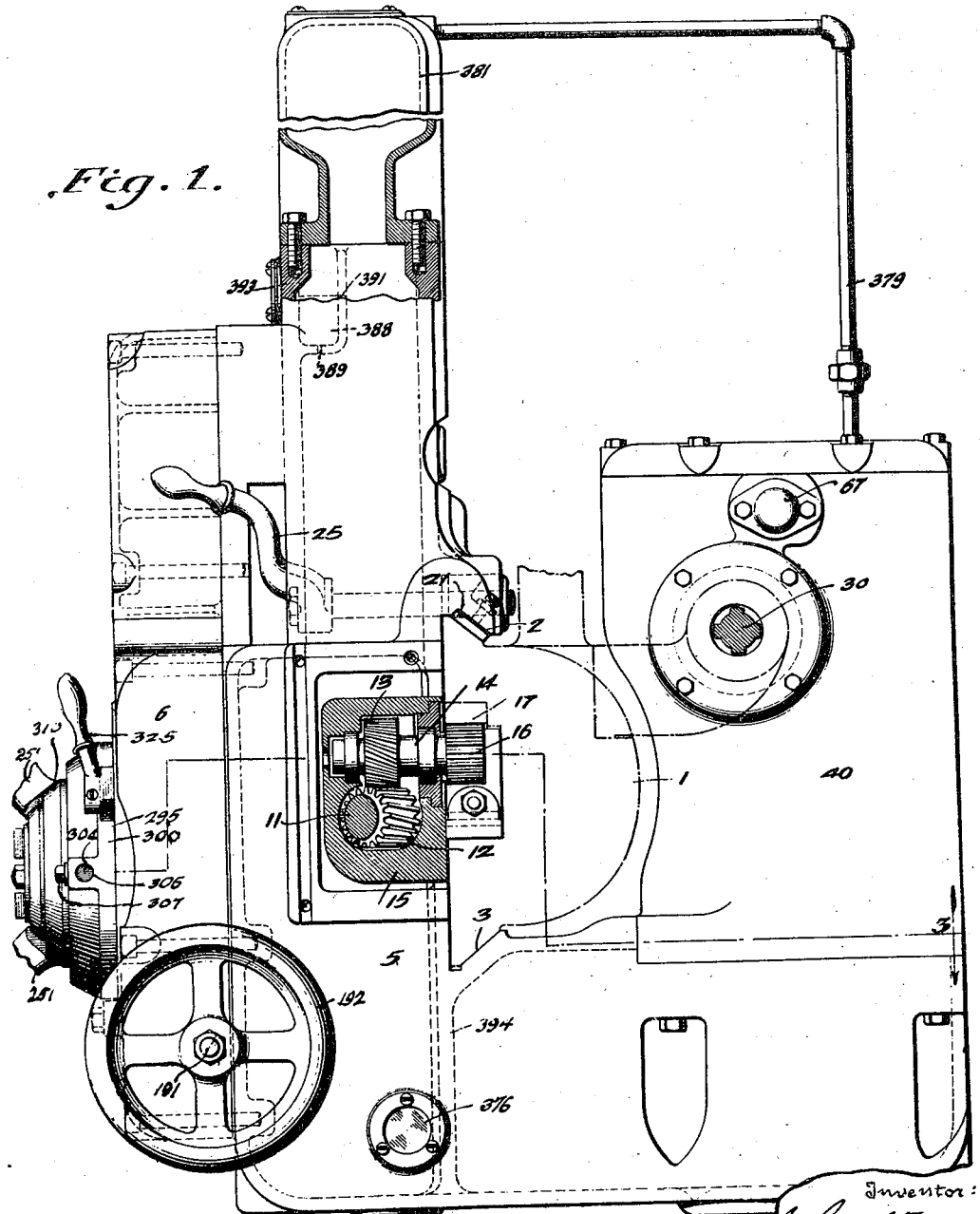
Figure 1 is a side view of the head with the rail shown in phantom lines, with the means for hand translation of the head upon the rail shown in section.
Figure 2:
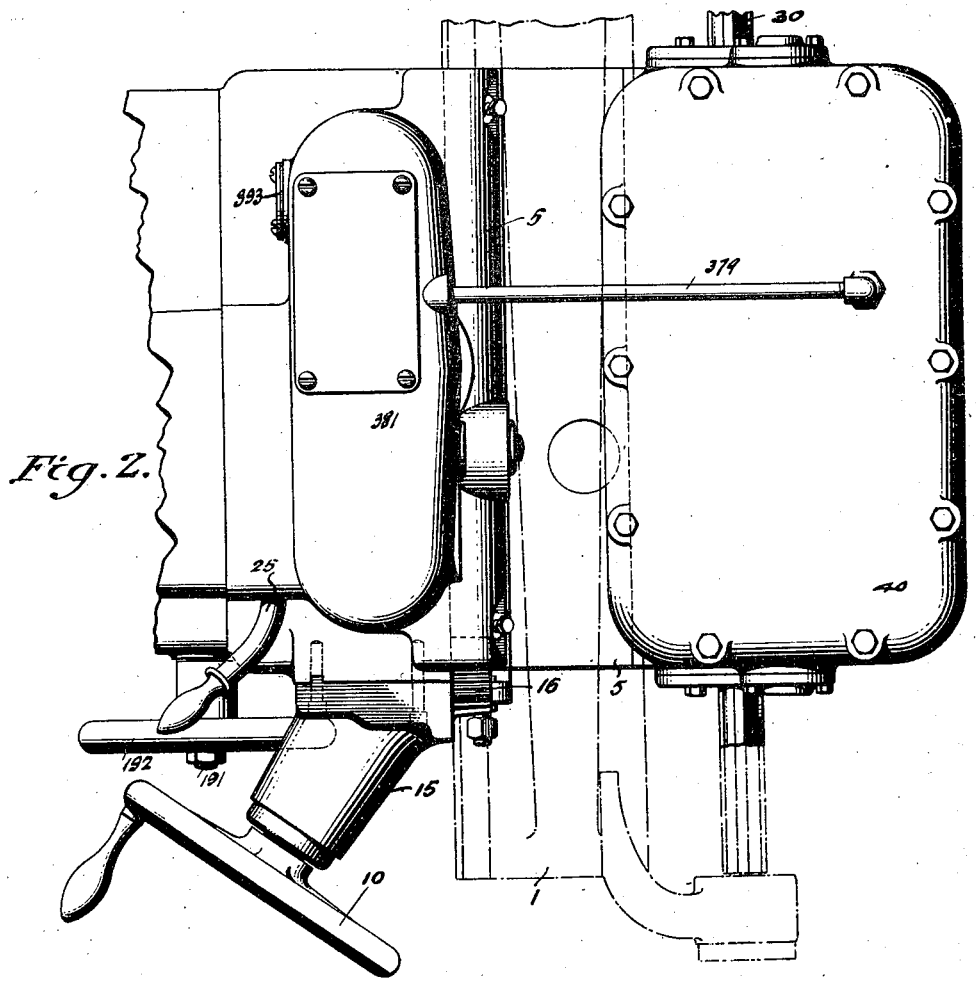
Figure 2 is a top plan view of the head with the rail shown in phantom lines, and the head positioned near the outer end of the rail.

The arm of a drilling machine is indicated by the numeral 1 and is attached in a horizontal position to the column of the machine, not herein shown. The cross section of the arm is shown in phantom lines in Fig. 1, and the arm provides upper and lower convergently related slideways engaged with respective upper and lower slideways 2 and 3 of the L-shaped casing 5, which casing contains in its lower and forward portion the spindle and balancing mechanism therefor, and spindle transmission mechanism. Means for manually translating the head upon the arm are provided, the same consisting of a hand-wheel 10 attached at the outer end of shaft 11, said shaft having at the inner end a spiral gear 12 meshing with a companion spiral gear 13, upon a horizontally disposed rotatable shaft 14 mounted in a separable casting 15, suitably bolted to the L-shaped casing or housing 5. At the rear end of the shaft 14 is a spur gear 16 meshing with a rack 17, said rack attached within a horizontal groove of the arm 1, see Fig. 5.

At the rear of the casing 5, as a part of the upper slideway 2, is a clamp plate 21 engageable with the upper way of the arm 1 and designed to clamp the head to the arm by operating lever 25, a detailed description of which clamping action is omitted.

The balanced head is slidable upon the arm, is of U-shaped configuration, and has mounted in the vertical limb thereof at the front side of the arm, a spindle, and mechanism for rotating and translating the spindle, and has mounted in the opposite parallel vertical limb at the opposite side of the arm, reversing and transmission mechanism, and has in addition intermediate speed change mechanism connecting said transmission mechanism with said spindle rotating mechanism, this intermediate mechanism being disposed beneath the arm. The head also comprises the L-shaped front section, which is adapted to be slidably attached and engaged with the arm, this section having a horizontal extension passing beneath and rearwardly of the arm, and having attached thereto the said upward extension lying at the rear thereof.

The main drive or power shaft is indicated at 30, is horizontally disposed relative to the arm, and is in driving connection with the speed box mechanism carried at the inner end of the arm adjacent the column, said box not herein being shown. The shaft 30, which will hereinafter be referred to as the power shaft, is of castellated construction, the castellations being engaged with the bevel gears 31, 32 of the reversing mechanism mounted in casing 40 of the head, see Figs. 4 and 31. The bevel gears are slidable with the head and upon the shaft 30. The reversing mechanism shown in Fig. 31 comprises, in addition to the bevel gears above mentioned, a third bevel gear 35 in constant mesh with said gears 31, 32, providing means whereby rotative motion in either direction may be communicated to vertical drive shaft 36 mounted in the housing or casings 5 and 40 of the head. The shaft 36 is supported at its upper end in ball bearing 45 and at its lower end in ball bearing 46 and has mounted thereon, in addition to the bevel gear 35, the upper cluster comprising the two gears 47, 48, said gears being translatably engaged with the castellations 55 of the shaft. The lower end of the shaft has rotatively mounted thereon the castellated sleeve 50, upon which sleeve is translatably mounted the lower cluster comprising the gears 51, 52, said sleeve having detachable clutch engagement by means of teeth 53 with the lower end of the upper cluster comprising the gears 47, 48. Engaged with gear 48 of the upper cluster is a shifter fork 56 extending from the shifter sleeve 57 splined as at 58 to the sleeve 59, which sleeve 59 is non-rotatably fixed in upper and lower bearings and has rotatably mounted therein a vertical shifter shaft 60 parallel with and located rearwardly of the shaft 36. The sleeve 59 is held stationary in its bearings by the screw 61 and forms a bearing for the shaft 60. At the upper end of said shaft 60 is attached a shifter arm 62, the outer notched end of which engages a pin 63 of a block 64 pinned to a translatable rod 66 mounted in bearings 67 in the top of the casing 40. Attached at opposite sides of the rod 66 are shifter forks 68, 69, adapted to operate suitable clutches for alternately engaging companion clutches of the bevel gears 31, 32, to cause the rotation of said gears with said power shaft, by which means the rotation of the shaft 36 may be reversed by manipulating the hand lever 70 attached to the lower end of the shaft 60. A detailed description of the reversing mechanism is not herein given inasmuch as the same forms the subject matter of a copending application for reversing gearing, filed March 23, 1922, Serial No. 546,137, to which application the reader is referred. The gears 51, 52, as a cluster are shiftable by the shifter fork 54 extending from a shifter sleeve 65, which sleeve is slidably keyed as at 71 to the bearing sleeve 59. The gears 51, 52, are engageable with gears 72, 73, as a cluster mounted upon a short shaft 74, stepped in ball bearings 75 in the frame 5, said gears 72, 73, being intermediate between the companion gears upon sleeve 50, and the drive gear 80 non-rotatably attached to the rotatably mounted spindle-operating sleeve 81 surrounding the spindle 82, and splined or slidably keyed thereto by means of the diametrically related longitudinal grooves 76. This splined connection permits translative motion of the spindle within the sleeve 81, said spindle being rotated by the sleeve through means of the gear 80. The gear 80 is located adjacent the lower end of the spindle and at a level beneath that of the rail, thus applying power to the spindle at the nearest possible point, relative to the tool and work, and providing a very strong structure.

The sleeve 81 is counterturned to provide a shoulder below the gear 80, against which shoulder is engaged one element of a ball bearing 83, the outer element of which bearing is engaged within a cavity of an annular bearing block 85 disposed at the lower end of the casing, extending upwardly therethrough and held non-rotatively therewithin. This block is removably attached to the casing by the screw 86, permitting the sleeve 81, spindle bearing and spindle to be conveniently removed. The spindle is provided with the usual tool socket 90 at its lower end. The upper face of the gear 80 is provided with clutch teeth 91 engaged with diametrically related notches 92 in the circumferential flange 93 of the sleeve 81, by which means the gear and sleeve are positively locked to rotate in unison. The sleeve is supported at its upper end in the ball bearing 94, and is provided at the upper extremity on its upper periphery with the spur teeth 95, which teeth are operably engaged with the teeth of companion spur gear 96 as the first gear of a translative spindle feed speed-change mechanism, described in detail under the heading, "Speed-change mechanism for spindle translation."

Figure 8:
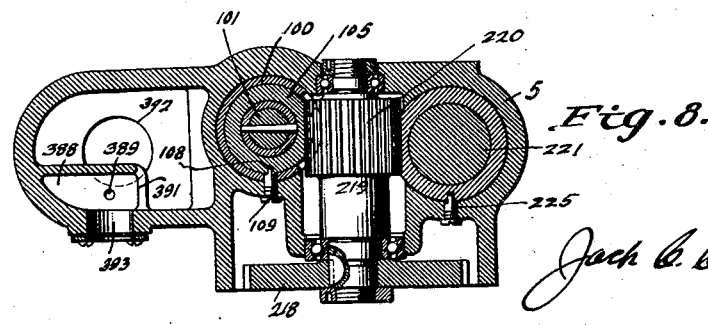
Figure 8 is a horizontal section through the spindle and balance therefor, on the line 8—8 of Fig. 5.
Figure 3:
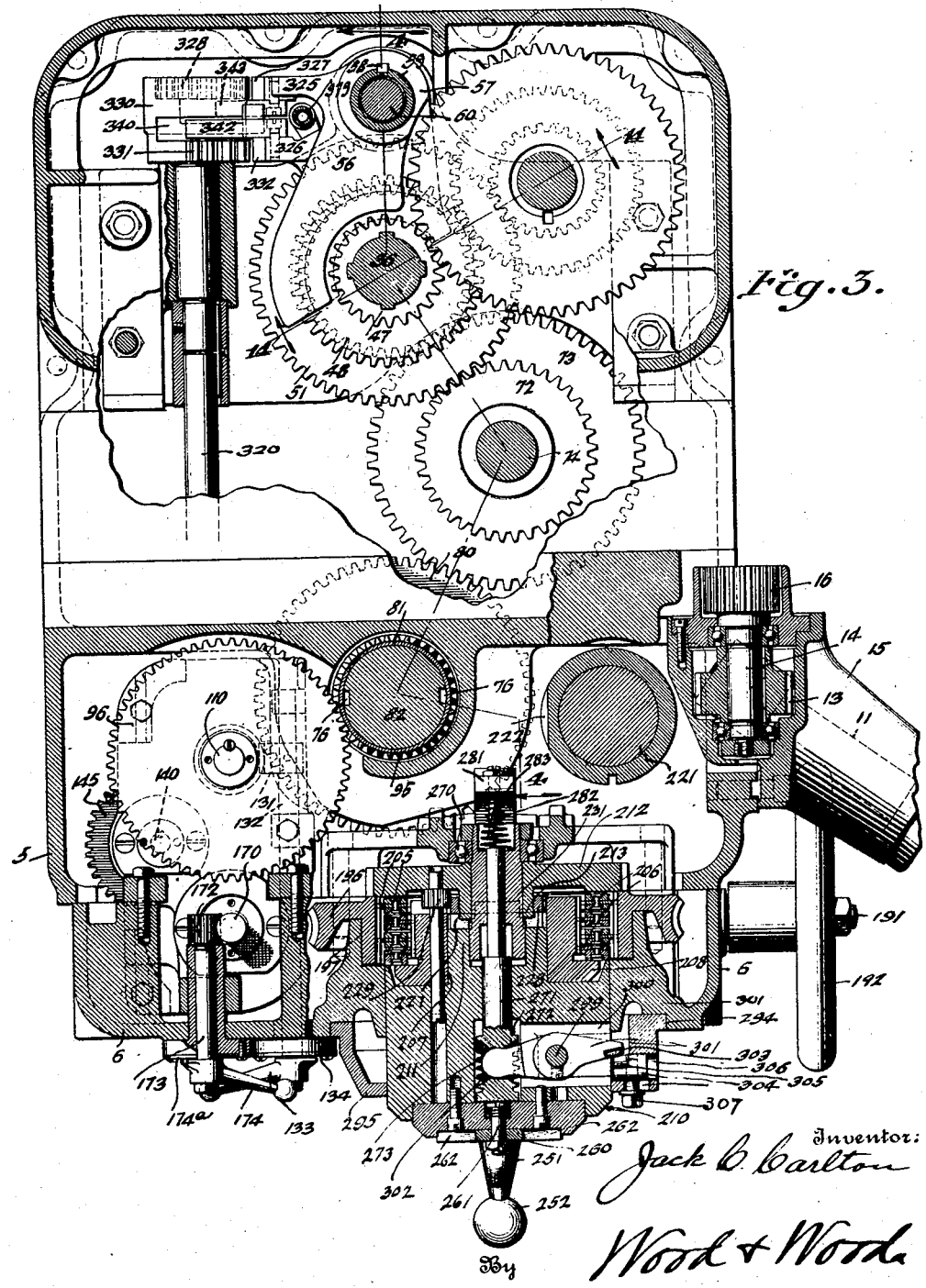
Figure 3 is a plan section of the head taken approximately on the line 3—3, of Fig. 1.

As before stated, the spindle 82 is slidably keyed to the sleeve, and the power to the spindle is received through the sleeve, both for translating and rotating the same. The upper end of the spindle is rotatable within a tubular rack sleeve 105 slidably but non-rotatably in the bearing sleeve 100. The upper end of the spindle is counterturned to provide a reduced upward extension 101, and to provide a shoulder 102, against which and about the counterturned portion is placed a ball bearing 103 as a thrust bearing. Engaged with the upper end of the thrust bearing, surrounding the reduced counterturned portion 101 of the spindle, and engaged with and rotative upon upper and lower bearing bushings, thereon, is the rack sleeve 105 having horizontally disposed segmental rack teeth 106. The sleeve has at its upper end the flanged bearing bushing 107 engaged and retained by washer and cap nut. The rack sleeve is translatably and non-rotatably held, and the bearing sleeve is locked within the frame (see Fig. 8) by the dog-point screw 109, the point of which engages a groove 108 of the rack sleeve, with the shank traversing the wall of the bearing sleeve. This construction provides for the rotation of the spindle, within the sleeve 105 and for the translation of the sleeve without rotation. Thus the spindle may rotate within the rack sleeve while the same is being translated by the mechanism now to be described.

*Speed change mechanism for spindle translation.*

Mechanism for causing translative movement of the spindle and for varying its speed of translation comprises the following elements, the speed change portion of the mechanism being mounted in a detachable frame, as a unit.

The teeth 95 of the spindle drive sleeve mesh with the teeth of the spur gear 96, which gear lies in horizontal plane and is engaged with the castellations at the upper end of shaft 110 mounted in upper and lower ball bearings 111, 112 of a frame unit 143 attached to the casing 6, in turn detachably bolted to casing 5. The shaft is counter-turned, shouldered and castellated to provide for the proper mounting of drive and clutch mechanism, now to be described.

Below the gear 96 and upper bearing 11, mounted upon the shaft and engaged against a shoulder 113 thereof, is rotatively mounted upon a retaining bushing pinned to the shaft, a spur gear 115 as a sleeve gear, having clutch teeth 116 engageable with corresponding teeth 117 of a shiftable double-faced clutch member 118 splined to the central castellations 119 of the shaft. The opposite clutch teeth 120 of member 118 are engageable with companion clutch teeth 121 of the spur gear 122, rotatively mounted upon the bushing 123 surrounding the shaft, the said bushing being non-translatable and engaged at one end against a shoulder 124, and at the opposite end engaged by one element of the lower ball bearing 112. The gears 115, 122, as speed multipliers or reducers may be caused to rotate with the shaft and transmit power as herebelow described, when either is engaged by the clutch. Upon the outer periphery of the clutch member 118 are circumferential rack teeth 130 engaged by the teeth of a segmental gear 131 mounted upon the shaft 132 held in suitable bearings and having at its outer end a handle 133, and a pointer thereon. The pointer overlies the dial plate 134, upon which dial plate are characters, in this instance A, B, indicative of the positions of the clutch.

Mounted in parallel relation to the shaft 110 and spaced therefrom is a castellated shaft 140 mounted in upper and lower bearings 141, 142, carried by the frame 143. Upon the shaft 140 are arranged vertically, one over the other, a series of spur gears, the top gear 145 of the series being in mesh with the spur gear 115, and the bottom gear 146 of the series being in mesh with the spur gear 122. Intermediate the gears 145, 146 are the gears numbered respectively 147, 148, 149 and 150. Rotatably mounted in parallel relation with the castellated shaft 140 and spaced therefrom, is a tubular shaft 150 held in upper and lower bearings 151, 152, and having formed thereon at its lower end a bevel gear 153 meshing with the companion gear 154 attached to a horizontal stub shaft 155 mounted in the hanger bearing 156 at the bottom of the frame 143.

Figure 22:
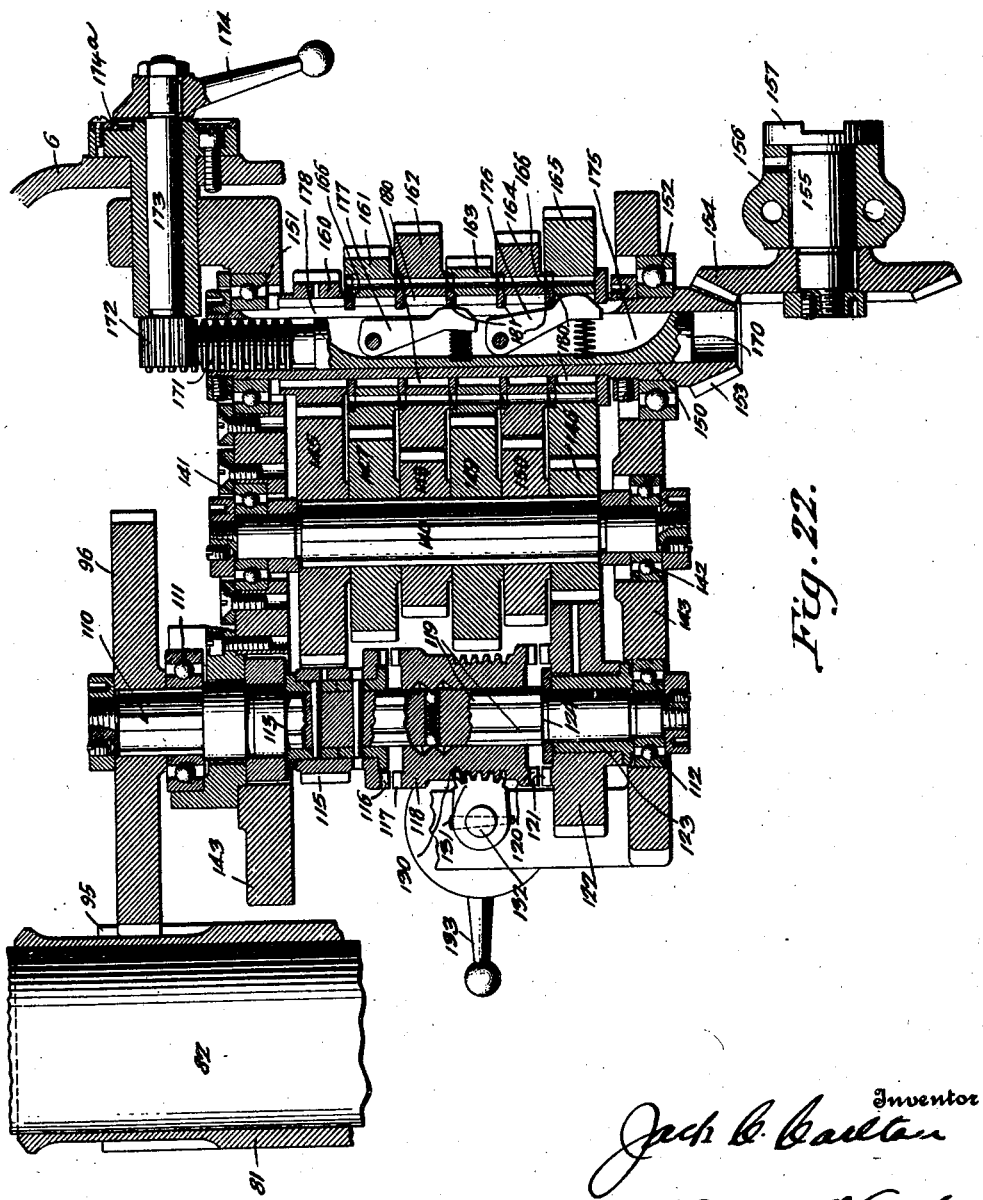
Figure 22 is a diagrammatic view of the translative spindle feed speed-change mechanism.

The shaft 155 at that end opposite the gear 154, has a circular clutch head 157, adapted to be engaged by a feed clutch member 190 in a manner hereinafter described. Rotatably mounted upon the tubular shaft 150 are the gears 160, 161, 162, 163, 164, and 165, gear 160 being at the top and meshing with the gear 145, and the gear 165 being at the bottom and meshing with the gear 146. Set within depressions in the upper faces of the gears 161 to 165, inclusive, are rings 166, which function as spacers, each ring having a circular oil groove in its face, communicating with openings, traversing the ring. These openings communicate with corresponding openings of the gears, whereby oil is delivered to all wearing parts. Slidably mounted within the bore of the sleeve shaft 150 is a plunger 170 having at its upper end circumferential rack teeth 171, engaged by the spur wheel 172 mounted upon the horizontal operating shaft 163, at the outer end of which is the operating lever 174 having a pointer riding over a dial 174$^a$ as in the case of the lever 133. Suitable characters are placed on the dial indicative of the speeds corresponding to various positions of the lever and plunger. The plunger 170 is slotted as at 175, and has pivotally mounted therein upon cross pins, outwardly spring-pressed pawls 176, 177. The sleeve 150 is slotted longitudinally as at 178 and the pawls are adapted to extend into, and in certain instances, therethrough for engagement with notches 180 of the gears 160 to 165, inclusive, each gear having a plurality of teeth, forming such notches. The pawls are also adapted to progressively and alternately engage projections 181 of the rings 166, which projections extend inwardly from the bore of the ring, into the slot 178 a sufficient distance to lock the rings against rotation and to cause disengagement of the pawls from the notches 180, when the plunger 170 is translated a proper distance conformable to the setting of the lever 174. By the arrangement herein shown, speed changes in geometrical progression may be obtained. As shown in the drawing, if the clutch 118 is engaged with the teeth of the gear 115, power will be transmitted to the gear 145, through the shaft to gear 146 and to gear 165. If the clutch is engaged with the teeth of the gear 122, the speed of the gear 165 will be correspondingly changed. It will be noted one pawl is disengaged, when the other is engaged. Thus, when the plunger 170 and pawls 176, 177 are caused to travel upwardly from the position shown in Figure 22, the pawl 176 will engage projection 181 of the ring 166 immediately above, pulling the pawl from engagement with the notch of gear 165, while the pawl 177 will engage the notch of the gear 162.

A speed change mechanism is thus provided, having two series of gears rotatively mounted, the pitch of successive gears of one series being progressively increased over that of the corresponding gears of the other series. Means is provided which is adapted to be successively engaged and disengaged from the gears of one series simultaneously with the disengagement and engagement of the other with the corresponding gears of the other series, whereby one of the elements, in this instance a pawl, is always engaged with a gear of one of the series to lock the same for rotation, when the other is disengaged from the corresponding gear of the other series, whereby the successive alternate engagement and disengagement of the pawls causes gradual increase or decrease of speed change ratios, according to the direction of translation of a translatable plunger, carrying the pawls.

*Power and clutch mechanism for spindle translation.*

Figure 16:
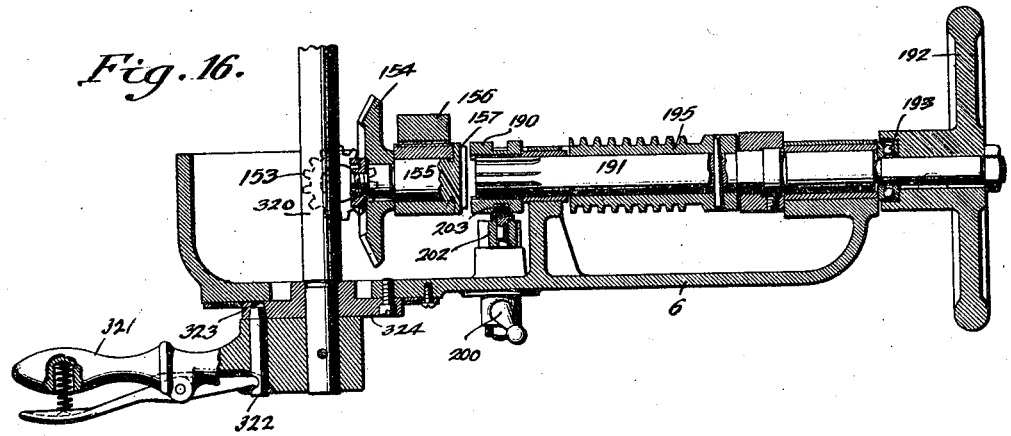
Figure 16 is a horizontal section showing hand-operated mechanism for translating the spindle.
Figure 15:
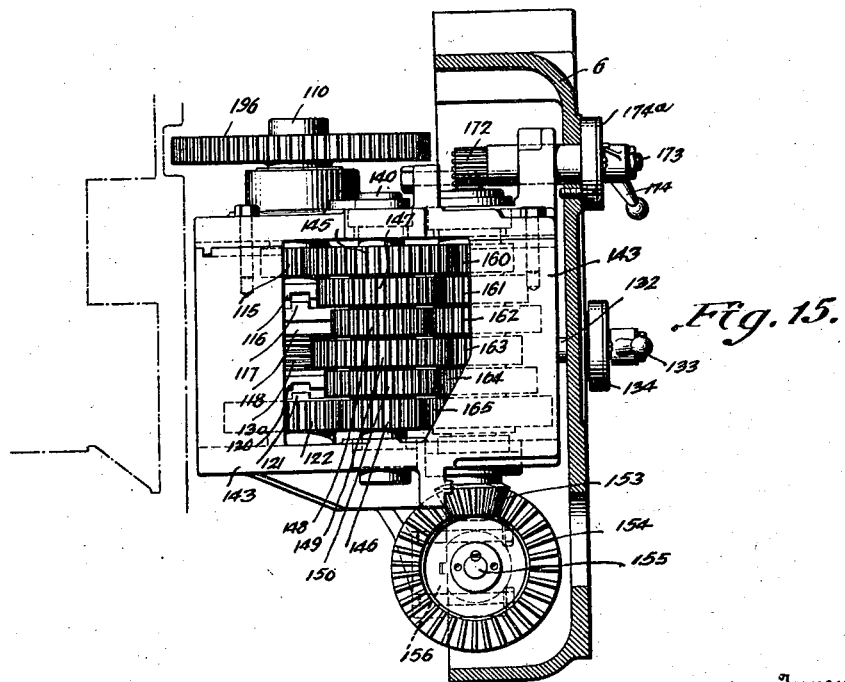
Figure 15 is a vertical sectional elevation of the translative spindle feed speed-change unit.

Cooperable with the clutch head or member 157 is a companion clutch member 190 slidable upon the castellations at the extremity of the horizontal shaft 191 suitably rotatively held in bearings of the frame 6 (see Fig. 16). At the outer side of the frame or casing 6 and mounted in the handwheel 192, is a thrust bearing 193 engaging the side of the frame. Upon the shaft 191, intermediate its bearings, is pinned a worm gear 195 adapted to mesh with the companion worm gear 196 mounted for rotation in a vertical plane and held for such rotation as at 197 in the frame 6 (see Figs. 3, 7, 9, 10).

The worm wheel 196, as a spindle translating drive gear, is adapted for manual rotation by the wheel 192 when the clutch 190 is disengaged from the clutch member 157, as shown in Figure 16. The disengagement of the clutch 190 is obtained (see Figure 21) by the operating lever 200 mounted upon a shaft 201 held horizontally in suitable bearings in the frame 6, said shaft having at its inner end a crank 202, and a shoe 203 at the outer end of said crank engaged with the groove of the clutch 190. When the clutch 190 is engaged with the clutch 157, the worm is conditioned for rotation by power through the speed change mechanism hereinbefore described. The gear 196 is provided with a hub extension having its outer surface engaged with the corresponding inner bearing surface of a circular cavity formed in the frame 6, and the worm gear is thus mounted for rotation. The bore of the worm gear is provided with teeth, with which are non-rotatably engaged clutch discs 205 alternating with clutch discs 206, in turn non-rotatably attached to the bushing or sleeve 207, having at one end a circular radial flange 208, and provided with exterior teeth with which the discs 206 are engaged. The sleeve is slidably keyed as at 209 to a cylindrical extension 211 of the cylindrical head 210, mounted rotatably within the frame 6 and held from lateral movement therein, through its connection with gear 212. The head has mechanism therein for manually transmittingly engaging, and for automatically releasing or disengaging the clutch discs 205, 206, at the limit of spindle translation in both directions, to prevent overtranslation of the spindle in either direction, and for obtaining automatic discontinuance of spindle feed at any point between such limits. The last disc 206 of one series engages or is engaged with the flange 208 and the inner disc 205 of the other series is engaged or is engageable with the face of the spur gear 212 clutched by projections 213 to, and rotatable with, the cylindrical extension of the head 210. The teeth or projections are carried by a sleeve extension of the gear, which extension is exteriorly threaded as at 227, and a nut 228, in the form of a spur gear is in threaded engagement with the threads of said extension. One face of the gear or nut engages the end face of the cylindrical extension of the head, and by rotating the nut the distance between the opposing face of the gear 212 and head 210 may be varied to correspondingly allow decreased or increased throw or translation of the sleeve 207. The spur gear 212 is in mesh with intermediate spur gear 215 mounted upon a shaft 217 which is held in suitable ball bearings 216 within frame 6 (see Figs. 4 and 7). Meshing with the gear 215 is a spur gear 218 attached at the outer end of the horizontal shaft 219 held in bearings of the frame 20, and upon said shaft 219 is a pinion 220 in mesh with the teeth 106 of the sleeve 105. Power is thus transmitted through the worm 196 to the spindle for vertically translating the same.

Parallel with the spindle and slidable in bearings in the casings 5 and 20, at the opposite side of the gear 219 is a cylindrical member 221, as a spindle balancing member, having rack teeth 222 engaged with the pinion 220. The member 221 is keyed as at 225, (see Figure 8), against rotation, but is slidable in its bearing.

The gear 212 is rotatably and slidably engaged with the spindle 231, which forms a tubular bearing for the gear, said bearings being supported for rotation at one end in bearings 270 of the frame 6, and at the other in the cavity or bore of the cylindrical extension of the head. The gear 212 abuts the inner member of the ball bearing support 270, and this element receives the thrust of the gear when the discs are thrown against the opposite face of said gear during clutching operation.

The head, gear, translatable flanged sleeve, and discs carried thereby, are rotatable as a unit. The head 210 and gear 212, as before stated, are translatable with respect to one another and this translation is obtained by rotating the nut 228 by means of a pinion 229 (see Fig. 10) mounted on a shaft held for rotation in the gear 212 and head 210 and slidably traversing the slidable element 207. The head is bored, inwardly from its front face to provide for the introduction of a tool, such as a screwdriver, a slot being provided in the shaft for engagement by such a tool to rotate the pinion 229.

Referring particularly to Figures 18 and 19 the head is bored longitudinally at diametrically opposite points, to provide for the introduction of set screws 240 in this instance 4 in number. The inner ends of these screws are in threaded engagement with the gear 212, and slidably traverse the elements 207, 210, which former element is counter-bored concentrically with the bores of the screws to provide a socket in which, and surrounding the adjusting screw, is a coil spring 245 having its opposite end respectively engaging the gear and end wall of the socket. Preliminary to adjusting the distance between the head and the gear, the screws 240 are rotated in an appropriate direction, the springs 245 always acting to press the element 208 toward the head. After properly adjusting the screws, the pinion 229 is rotated in an appropriate direction, either to increase or decrease the distance between head and gear and the screws 245 are then tightened to hold nut 228 against the outer face extension 211.

Description follows of the mechanism for applying pressure to the clutch discs, and for maintaining the pressure until the spindle has reached its limit of translation in either direction, after which the pressure is automatically released and spindle feed discontinued.

*Automatic safety-limit clutch throw-out mechanism.*

Pivoted as at 249 within a diametric slot 250 of the head 210 are diametrically related levers 251 having knobbed handles 252, said handles extending outwardly at one side of the pivots. Each lever has a roller 254 pivoted to a relatively short arm at opposite side of the pivot 249. The rollers are engageable with diametrically related bosses 255 of the bushing or sleeve 207, and by bringing the lever handles together as shown in Figures 9 and 10 the bushing is translated, and the discs frictionally engaged for transmittingly clutching the worm wheel 196 with the spur gear 212. This clutching action is made against the action of the springs 245. Means for locking the levers in nonclutching or initial position as shown in Figure 7, comprises a circular latch 260 pivoted as at 261 which latch has diametrically related notches 262 in its periphery. When the latch is turned to the position shown in Figure 6, the levers cannot be brought together, but when the latch is turned at a right angle at the position shown to align the notches 262 with the levers, said levers may be brought together to apply pressure to the discs. Within the bore of the arbor 231 in translatably and rotatably mounted a shaft 271 shouldered as at 272 to provide a stop for limiting outward movement of the shaft. The outer head end or extremity of the shaft 271 is provided with circumferential teeth 273, said teeth engaging corresponding teeth 274 of the levers 251. When the levers are brought together from a position shown in Figure 7, the shaft is translated inwardly disposing its opposite extremity beyond the arbor as shown in Figures 9 and 10.

Pivoted as at 280 at the rear of the gear 212 upon the frame 6 (see Figures 3, 7, 9, 10, 11, 12, 13) is a trip lever 281 having at its upper end the adjustable pin 282 adapted for engagement with the end of the shaft 271 to throw the same outwardly from position shown in Figure 9, a spring 283 being interposed between the end of said lever 281 and the socketed end of the arbor 231 for normally holding the upper end of said lever away from the end of shaft 271. At the lower end of the lever is pivoted as at 285, a latch 286 having the teeth 287, 288 engageable under certain conditions by the lug 289 projecting horizontally from the outer face of the gear 212. The latch 286 has the spring pressed detent 290 engageable alternately with the notches 291, 292, whereby the latch may be set in two angular relations relative to its support and to lug 289. Inward movement of the trip lever is adjustably limited by the stop 293, the conical end of which is engageable by the lower end of pivot 285. With the spindle in its lowermost position the teeth of the latch 286 are disposed as shown in Figure 13, in which position the hand levers 251 are locked, as shown in Figure 7, and the clutch is disengaged. Whenever the spindle reaches either of the limits of translative movement this locking action occurs. When the spindle is traveling downwardly, the gear 212 rotates in counter-clockwise direction, and when the spindle travels in the opposite direction the said gear is correspondingly reversed.

Before the clutch can again be thrown in by pulling the levers toward one another from the position shown in Figure 7, the handles must be grasped and the head 210 rotated for sufficient distance in the direction opposite that in which the head was traveling to disengage the lug 289 from the tooth 288. For example, if the lug has been traveling in the direction indicated by arrow *a* of Figure 13, and has arrived at the position shown, it will be necessary to release the same from engagement with the tooth of the latch lever by moving the lug a short distance in the direction indicated by the dotted arrow *b*, after which the clutch may be thrown in and the drive mechanism reversed, which reversal will cause rotation of the gear in direction indicated by the arrow b, and the spindle will begin its upward travel. The drive worm 196 rotates in counter-clockwise direction to feed the spindle downwardly, but whatever the direction of spindle travel the gear 212, when the clutch is engaged, makes two complete revolutions before the trip lever is thrown. Figure 12 represents the position of the teeth of the latch 286 relative to the lug 289 as said lug approaches the latch after the gear has completed its first revolution during the travel of the spindle in downward direction from its uppermost position. Upon further movement in anti-clockwise direction from the position shown in Figure 12, the lug 289 will engage the tooth 287 and throw the latch to a position shown in Figure 13, but without operating the trip lever. After throwing the latch, the gear continues its travel in the same direction and completes a second revolution, at the end of which the lug engages the tooth 288 as in Figure 13, which tooth has previously been thrown into its path, pushing the lower end of the trip lever 281 outwardly and causing the pin 282 to engage the end of the shaft 271 as shown in Figure 11, thus releasing the clutch and returning the hand levers 251 to the position shown in the Figure 7. The mechanism will be stopped in this position and will remain locked until the hand levers are grasped and the head is turned slightly in clockwise direction to release the trip lever and permit the shaft 71 to slide rearwardly, and allow the levers to be pulled toward one another to clutch in after the power has been reversed by operating the reverse lever 70, to change the direction of rotation of the worm gear 196. When the direction of rotation has been changed thus, movements of the latch 286 will take place in reverse order.

The above described mechanism is in the nature of a safety device to prevent over-translation of the spindle in either direction. A mechanism is also provided for automatically throwing out the clutch to positively discontinue spindle translation at any position between its translative limits, a description of which mechanism follows:

*Automatic spindle depth feed limiting mechanism.*

The purposes of the following described mechanism are to obtain a predetermined length of translative feed movement of the spindle to feed the tool into the work a predetermined depth, and to automatically stop the feed when the tool has reached such depth. The device provides mechanism which may be manually set to accomplish the latter operation automatically.

Pivoted as at 299, within a radial slot 300 of the head 210 is a lever 301 having its inner end suitably shaped and slidably engaged within a diametric slot 302 of the shaft 271. The outer end of the lever is chambered convergently at opposite sides, as best shown in Figure 19, to form cam faces 303 engageable with the projecting end of a pin 304 correspondingly chamfered as at 305 and slidable in a radial bore 306, in an angular adjustable dial member 295. A set screw 307 traverses a slot 308 of the dial, and has threaded connection with the pin 304, whereby said pin may be adjusted inwardly or outwardly, respectively into and out of the path of rotation of the lever, and immovably set in such adjusted position. The pin as shown in Figure 10 is in tripping position.

The circular dial 295 is mounted at the front of the frame 6, concentrically with and rotatable upon the head 210 and within the depression 294 of the frame. The head has marginal graduations 296 thereon, said graduations being numbered in correspondence to the length of the desired translative spindle feed in inches, whereby when a given graduation is made to correspond with the zero mark 297 of the head, the pin 304 will be so positioned that the shaft 271 will be tripped, and clutch discs released, to stop spindle translation at a point corresponding to the dial setting. For example, when the dial is set with the numeral 6 opposite the zero mark of the head, and the handles are brought toward one another to throw the clutch in, the spindle will be fed downwardly 6 inches and when it has traveled that distance its motion will be automatically arrested. This automatic arrest of the spindle feed is accomplished through the translation of the shaft 271, which disposes the outer end of the shaft in a position non-engageable by element 282.

In setting the mechanism for stopping spindle feed, in the manner just described, the clamping lever 325 is manipulated to release the dial member and said member is then rotated to bring the desired graduation opposite the zero mark of the head 210. This places the pin in a determined angular relation to the lever, after which the dial member is clamped against further rotation by lever 325.

To start translative spindle feed, the levers are then pulled to position shown in Figure 9 and head 10 begins to rotate, if feed clutch 190 is engaged. When sufficient rotation has taken place in conformity to the setting of the dial, the chamfered surface of lever and pin will engage. The lever will be thrown in counter-clockwise direction, see Figure 10, the plunger will be translated to the right, separating and throwing the handles to initial position.

Thus releasing element 207, which is also thrown to the right by action of the springs. When it is desired to stop translative spindle feed at any stage in its movement, the clutch 190 may be disengaged from the clutch 157 and the spindle returned to initial position by means of the hand-wheel 192.

Speed change mechanism for spindle rotation.

Mechanism contained in the lower portion of the casings 5, 40, of the head, is provided for changing the speed of rotation of the spindle, and a shifting mechanism operating rod, or shaft 320, extends from the rear of the casing 5 forwardly beneath the arm 1, through casing 6 and has a handle 321 thereon having a lever operated latch pin engageable with openings 323 in a dial, plate 324 at the front of the head, said plate having characters thereon, one adjacent each opening, indicative of the speed change obtainable by setting the latch pin within that opening.

The position of the parts in Figures 3, 4, 14, 25, 28, 29 and 30 are in correspondence, the corresponding position of the operating lever in Figure 6 being indicated by the dot and dash line x.

For convenience, a series of diagrams Figures 23 to 27, inclusive, start with the gears 47 and 48 in their uppermost position, which position corresponds to the setting of the lever shown in Figure 6, with its pin in the opening "7". For further convenience of illustration, the mechanism of the figures above mentioned is viewed from the rear.

The upper and lower shifter sleeves 57, 65, carrying forks respectively 56, 54, have arms 325, 326. The arm 325 projects outwardly and then downwardly parallel with the shaft 60, and has the spur teeth 327 engageable with corresponding teeth 328 of the shifter head 330, as a cylindrical member integral with the shaft. The head is also provided with teeth 331 substantially diametrically related to the teeth 328, of the same pitch but disposed in a different rotative plane, see Figures 3, 29. The said teeth 331 are engageable with the teeth 332 of the arm 326 of the lower sleeve 65, which extension projects at a right angle to the sleeve.

Between the teeth 328, 331, are substantially diametrically related pockets 340, 341, into which, under certain conditions, fingers 342, 343 are adapted to enter to provide clearance for said fingers. The said fingers are curved as at 344, 345, the curved surfaces being opposingly related and of equal radius with the outer circumference of the teeth 328, 331. Lying between, and in a rotative plane overlapping the rotative planes of the pockets, is a circular locking projection 348, which is also of equal radius with the said curved surfaces. The said circular projection is alternately engageable with the fingers, to lock one shifter sleeve while the other moves. The curved surfaces of the fingers are engageable with and by the projections 348 during a portion of the rotative cycle of head 330. Mounted parallel with the shaft 36 in bearings 350, see Figure 14 is a short shaft 351 having at its bottom the spur gear 352, with which gear the gear 51 operated by fork 326, is engageable. Keyed to the shaft 351 is a cluster, comprising the gears 355, 356, as intermediates, with which gears are engageable the gears 47, 48 of the cluster slidable by the fork 56 and arm 325. The gear 51 is engageable with both gears 352 and 72, and the gear 52 is engageable with the gear 73.

As shown in Figure 23, with the handle set at character "7" of the dial, power will be translated through shaft 36, gears 47, 352, 51, 52 and 73 to gear 80. The cluster gears 51, 52 are positively held from downward movement as result of engagement of the finger 342 with the circular projection 348.

A shifting mechanism connected with the speed change mechanism for spindle rotation is thus provided, and comprises the above described shiftable members, each having a rack, and each having the outstanding locking finger cooperable with the pockets of a rotatable shifter head disposed adjacent the members, said head having peripheral diametrically related sets of teeth respectively cooperable with corresponding racks, and having a segmental circumferential projection between the pockets and overlapping the rotative plane of each pocket, providing means whereby either finger, after riding out of a respective pocket, may be engaged by said projection to lock the corresponding shiftable member against movement.

Upon rotation of the head 320 in direction indicated by the arrow, see Fig. 24, the gears 47 and 48 are lowered and the gear 48 is brought into engagement with gear 356. During this movement the finger 343, which previously projected within the pocket 341, is lowered to the position shown, and the finger 342 remains in engagement with the projection 348 to positively maintain gears 51, 52, in the position shown. The power under these conditions is transmitted from shaft 36 through gears 48, 356, 352, 51, 52, 73, to gear 80, and the latch pin 322 of the handle 321 is engaged in opening "8".

Upon continued rotation of the head in the same direction from the position shown in Figure 24, the gear 48 is disengaged from the gear 356 and the clutch teeth 53 are brought into engagement, coupling the gear 48 directly with the gear 51: During this movement the finger 343 rides out of pocket 341 and is engaged by the locking projection 348, which projection as shown in Figure 25, is engaged with both fingers 342 and 343, locking both shifter sleeves against movement, the upper against upward movement and the lower shifter against downward movement.

Upon continued rotation of the head 330, bringing the latch pin into engagement with the opening "N", or neutral, teeth 331, mesh with teeth 332, and the cluster comprising the gears 51, 52, is shifted, disengaging gear 51 from gear 352, and clutch teeth 55 are disengaged, disposing the cluster containing gears 51, 52, in the position shown in Fig. 26. The finger 343 remains in engagement with the projection 348, and the finger 342 lies within the pocket 340.

From the neutral position shown in Figure 26, the gears may be shifted to the position shown in Figure 27, bringing the gear 51 into engagement with the gear 72, the shifter sleeve 57 being locked against upward movement by engagement of the finger 343 with the projection 348. In this position the latch pin is engaged in the opening "10."

Upon reversing the direction of rotation of the head 330 from position shown in Fig. 27, the curved surface 344 of the finger 342 will be engaged by the projection 348, and the head through engagement of its teeth 331 will raise the gears 51, 52 again to neutral position.

Oiling system and operation thereof.

A description follows of the system and mechanism for oiling my improved, underslung, head casing, which is a mechanical and gravity system. Special reference may be had to Figures 1, 4, 5 and 32. Detachably secured below and to the bearing plate 369 attached within the rearward extension of casing 5 as a support for the ball bearing 46 of the shaft 36, is a pump casing 370 containing a pump comprising the meshing gears 371, 372. The pivot 373 of the gear 371 projects upwardly through the casing 370 and the end of the same is engaged within a slot 375 in the lower end of the shaft 36, by which means the gears are rotated when the shaft 36 is rotated. The bottom portion of the casing 5 forms a reservoir, in the outer wall of which is a sight opening 376 closed by the usual glass, whereby the level of oil within the casing may be observed. Oil is delivered from the reservoir formed by the casing 5 to the gears 371, 372 centrally thereof, through an oil inlet opening 377, the said opening being disposed for delivering oil at the meshing points of the two gears, from which point the oil is forced by the rotation of said gears between and past the same into an outlet or delivery passage 378, connected with which is a delivery pipe 379 which extends vertically through the casings 5 and 40, between the arms 325, 326, and upwardly adjacent the transmission gearing, and through and beyond the top of the casing 40. At a level immediately above the transmission gearing, which gearing comprises the gears 31, 32 and related mechanism, the pipe is provided with apertures 380 through which the oil is forced in streams and delivered upon the top of said gearing, whence by gravity it reaches the gears 35, 41, 51 and mechanism contained in casings 5 and 40, from which mechanism it falls to the bottom of the casing 5. The delivery pipe 379 is extended across the casing 40 and enters at the top of the casing 381, bolted to the top of the casing 5. The casing 381 has formed in its upper wall a reservoir or pocket 382, into which the pipe 379 delivers through opening 383. The reservoir 382 is divided by the low partition 390 into two compartments, in the bottom of one of which is an opening 385, and in the other an opening 386 closed by fiber plug 387. The opening 385 is disposed over a catch basin 388 formed as a part of the front wall of the casing 20, and said catch basin has an opening 389 in its bottom. Oil is delivered to the reservoir 382 in that compartment between the partition 390 and the opening 386, whence said oil overflows into the compartment between the partition 390 and opening 385. The fiber plug 387 becomes saturated and the oil drips through the opening 386 on top of the spindle extension 101, and oil also flows through the opening 385, falling into the catch basin 388, and when in sufficient quantity, overflows the side 391 and oils the mechanism therebelow by splashing. In the front wall of the casing 5 opposite the catch basin is a glass covered sight opening 373 by which the level of the oil within the basin may be observed. The oil overflowing from the catch basin is caught by the parts intermediate the point of overflow and the lower part of the casing 5, and the mechanisms contained in the casings 5 and 6 are thereby oiled. If for any reason the flow of oil to the catch basin is interrupted, the oil remaining therein will flow through the opening 389 and the oil level will be lowered, indicating that the supply has been interrupted. Oil also flows through this opening and through opening 392 in the horizontal wall of the casing 5, into the bottom of said casing.

A partition 394, as a downward extension of the back wall of the casing 5, divides said casing at its bottom into two compartments, respectively containing the spindle bearing, drive gear and related parts, and the spindle rotation speed change mechanism. Openings 395 permit flow of oil through the partition from one compartment to the other.

All ball bearings at the bottom of the casing 5 are disposed and arranged to allow the flow of oil therethrough, as result of which the oil after lubricating the bearings is deposited at the bottom of the casing 5 at such a level that the same may flow to the pump inlet opening 377. Oil is delivered to the gear 80, flows through the bearing 83, see Figures 4 and 5, and is caught by the annular pocket 85ª in the element 85, whereafter it is delivered from the pocket through a passage 85ᵇ to the bottom of the casing and thence continues its circulation to a point beneath the pump. Overflow from the pocket is prevented by a washer interposed between the inner element of bearing 83 and upper inner wall of the pocket. A nut has thread engagement with the sleeve 81 and secures washer and pumping element against displacement.

This force-feed and gravity lubricating system provides means whereby oil may be delivered at the top of the casings and splash upon the various mechanisms therebelow, and further provides means whereby failure of operation may be immediately discovered, this latter object being accomplished by providing sight openings in the casing. The residual oil is received at the bottom of the head casing and returned to the pump, which is constantly operable by a vertical drive shaft at the back of the head. The oiling mechanism also provides positive means whereby all mechanism in the head of each side of and below the arm are lubricated by a pump lying below a lower bearing of one of the driving shafts and operated by the shaft.

Having described my invention, what I claim is:

1. A driving element independently mounted, a journal, a driven element on said journal, friction discs for each element adapted when compressed to cause rotation of the elements in unison, means for compressing said discs, and means for automatically releasing said compressing means, comprising a translatable member traversing said journal and attached at one end to said compressing means, and further adapted to be actuated by and to actuate said compressing means, a portion of said translatable member engageable from an outside point, a lever independently mounted having one end engageable with said translatable member when the discs are compressed, and a lug upon said driven element engageable with the lever whereby when said lug engages said lever said translatable member is actuated to release said compressing means.

2. A clutch mechanism comprising a driving element, a journal, a driven element on said journal, friction discs for each element adapted when compressed to cause rotation of the elements in unison, means for compressing the discs, and means for automatically releasing said compressing means, comprising a member translatable through the journal attached at one end to said disc compressing means and adapted to be actuated by and to actuate said compressing means, said member having an end engageable from an exterior point, a pivoted trip element having one arm engageable with the translatable member when the discs are compressed, a trip lug upon said driven element engageable with said trip element for translating said member to release said disc compressing means in a predetermined manner.

3. A clutch mechanism comprising a driving element separably mounted, a journal, a driven element upon said journal, friction discs for each element adapted when compressed to cause rotation of said elements in unison, means for compressing said discs, means for automatically releasing said compressing means, comprising a translatable member attached at one end to said compressing means, and adapted to be actuated by and to actuate said means, one portion of said translatable member engageable from an outside point when said discs are clutched, a pivoted lever having one arm engageable with the translatable member when the discs are compressed, and a lug upon said driven element engageable with the opposite end of said lever during rotation of the element.

4. A clutch mechanism comprising a driving element, a driven element, friction discs for each element, adapted when compressed to cause rotation of the elements in unison, means for compressing the discs including a head rotatable with said driven element, and levers pivoted to said head and adapted to compress said friction discs when brought toward one another, means for automatically releasing said levers comprising a translatable member attached at one end to said levers and adapted to be actuated by and to actuate said levers, one end of said translatable member engageable from an outside point, a pivoted trip lever having one arm cooperable with the engageable end of the translatable member when the discs are compressed and the levers are nearest one another, and a lug on said driven element engageable with the trip lever for translating the member to release said levers and disc compressing means in a predetermined manner during the rotation of said driven element.

5. In a drill spindle feed controlling mechanism, coaxial driving and driven gears, a friction clutch for coupling, providing a hub for journalling said feed driven gear, opposingly extended levers as a unit of feed friction clutch for manual clutch control, a clutch actuating rod axial of said gears and clutch connecting with said levers, a trip lever mounted on said hub and extending axially therethrough for actuating said rod, and a trip member adjustable on said hub for actuating said trip lever at a determined period in a driven gear cycle for automatic clutch control.

6. In a drill spindle feed controlling mechanism, coaxial driving and driven gears, a friction clutch for coupling said gears, providing a hub for said driven gear, opposingly extended levers upon said hub for manual clutch control, a clutch actuating rod axially of said gears and clutch, connecting with said levers, a trip lever for actuating said rod, and a trip member extending from said driven gear for actuating said trip lever at a determined period in a driven gear cycle for automatic clutch control.

7. In a drill spindle feed controlling mechanism, a frame, coaxial driving and driven gears, a friction clutch for coupling said gears and providing a hub for journalling said driven gear in said frame, opposingly extended levers mounted on said hub as a unit of feed friction clutch for manual clutch control, a clutch actuating rod axial of said gears and hub connecting with said levers, and means actuated by said driven gear at a point in the gear cycle for operating said rod for automatic clutch control in either forward or reverse rotation direct of said driven gear.

8. In a drill spindle feed controlling mechanism, coaxial driving and driven gears, a friction clutch for coupling said gears and providing a hub for journalling said driven gear, lever mechanism mounted on said hub for manual clutch control, a clutch actuating rod axial of said gears and hub, connecting with said lever mechanism, a toothed trip member on said driven gear, a trip lever adapted to engage and actuate said rod, a pawl upon said trip lever adapted to be engaged by said toothed trip member for automatic clutch control at a driven gear cycle limit, the pawl being alternately positioned upon co-operation with said toothed trip member in a clutch control position for one cycle direction of said driven gear to render the same effective for a reverse rotation of said driven gear.

In witness whereof, I hereunto subscribe my name.

JACK C. CARLTON.